Aug. 13, 1946.  F. J. SIGMUND ET AL  2,405,615
SUPPORT FOR WINDINGS IN MAGNETIZING CORES
Filed July 26, 1943
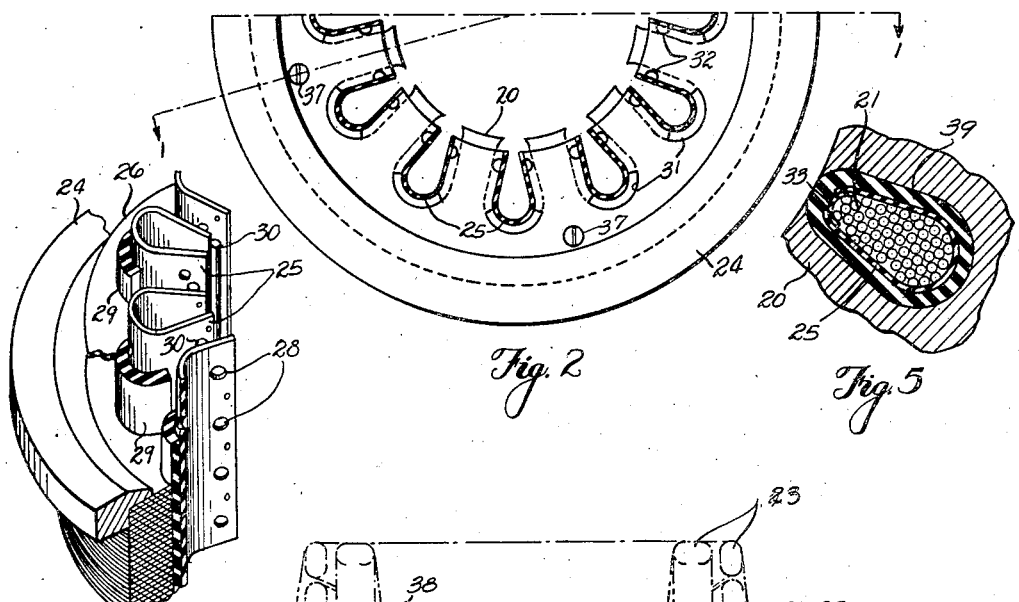
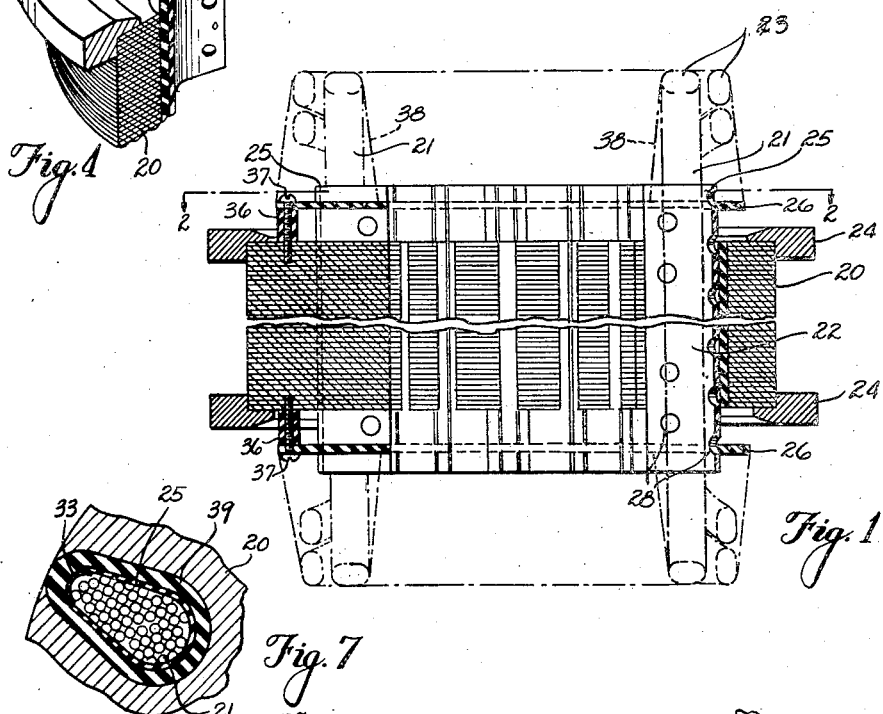
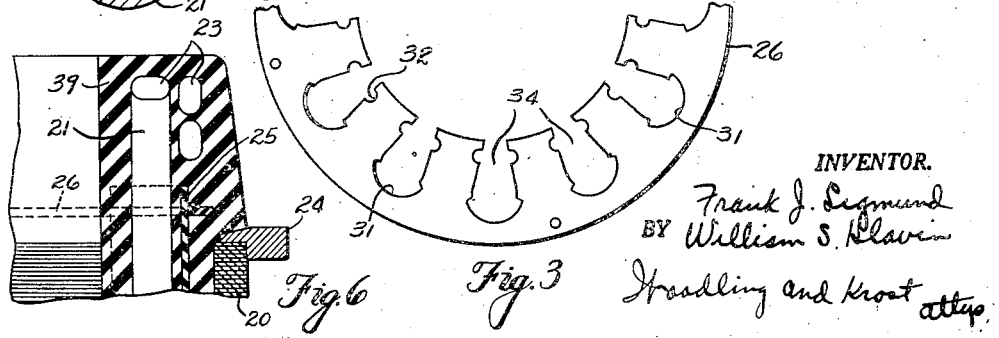
INVENTOR.
Frank J. Sigmund
BY William S. Slavin
Hoodling and Kroot
attys.

Patented Aug. 13, 1946

2,405,615

UNITED STATES PATENT OFFICE 2,405,615

SUPPORT FOR WINDINGS IN MAGNETIZING CORES

Frank J. Sigmund and William S. Hiavin, Cleveland, Ohio, assignors, by mesne assignments, to Sigmund Corporation, a corporation of Ohio Application July 26, 1943, Serial No. 496,136

12 Claims. (Cl. 171—206)

Our invention relates in general to winding elements for electrical machines and more particularly to winding elements for dynamo-electric machines and to the spacing of the windings at a distance from the inside surface of the slots.

This application is a continuation in part of our application filed July 9, 1942, Serial No. 450,240, for "Liquid-tight stator" now Patent No. 2,385,385, dated September 25, 1945.

An object of our invention is the provision of centralizing the windings within the slots of the magnetizable core of the electrical device.

Another object of our invention is the provision of a sleeve for each of the slots to envelope the windings therein and to hold the windings at a distance from the inside surface of the slot.

Another object of our invention is to extend the sleeves which envelope the winding beyond the ends of the magnetizable core and to hold the extended ends of the sleeves so as to space the sleeves at a distance from the inside surface of the slots.

Another object of our invention is the provision of completely surrounding the sleeves filling the space between the sleeves and the inside surface of the slots with an insulating material which also functions as a mechanical support for the windings as well as to make the windings water tight and vibration proof.

Another object of our invention is the provision of centralizing the windings within the slots of the magnetizable core by utilizing centralized sleeves or support means so as to leave a space between the windings and the inside surface of the slots to enable air or other cooling medium to come into intimate contact with the windings to cool same.

Another object of our invention is the provision of supporting the sleeves within the slots at a distance from the inside surface of the slots.

Other objects and a fuller understanding of our invention may be had by referring to the following description and claims, taken in conjunction with the accompanying drawing in which:

Figure 1 is a cross-sectional view of a stator of a dynamo-electric machine embodying the features of our invention, the section of Figure 1 being taken along the line I—I of Figure 2;

Figure 2 is a cross-sectional view taken along the line 2—2 of Figure 1 and shows particularly the sleeves for holding the windings at a spaced distance from the inside surface of the slots of the magnetizable core;

Figure 3 is a fragmentary planned view of a spacer plate employed to centralize the sleeves within the slots of the magnetizable core;

Figure 4 is a fragmentary and perspective view showing an arrangement of sleeves which are positioned in the slots of the magnetizable core;

Figure 5 is an enlarged cross-sectional view of a fragmentary portion surrounding a slot after it has been filled with insulating material;

Figure 6 is a fragmentary end view of a stator having insulating material filling the space around the sleeves and covering the windings which extend around the ends of the magnetizable core; and Figure 7 shows an enlarged cross-sectional view of a fragmentary portion surrounding a slot in a rotor after it has been filled with insulating material.

With reference to Figure 1 which shows a cross-sectional view of a stator into which the features of our invention may be adapted, the magnetizable core is identified by the reference character 20 which carries windings 21 comprising a plurality of coils positioned in the longitudinal slots thereof. The portion of the coils which lie within the slots may be designated as coil sides and the portion of the coils which extend beyond the ends of the magnetizable coil 20 may be designated as the coil heads. In the drawing, the coil sides are designated by the reference character 22 and the coil heads by the reference character 23. The laminations of the magnetizable coil 20 may be held together in any suitable manner and, as illustrated, ring plates 24 positioned upon each end of the core may be employed for this purpose. The ring plates 24 compress the laminations together to make a rigid construction. Within the slots of the magnetizable core we insert perforated sleeves 25 having openings 28 in their side walls so that the insulating material which surrounds the sleeves may readily flow in intimate contact with the windings. The object of the perforated sleeves 25 is to centralize the coil sides within the slots of the magnetizable core so that the coil sides do not mechanically touch the magnetizable core. The ends of the perforated sleeves 25 may be centralized within the slots in any suitable manner and, as illustrated, they are centralized within the slots by means of spacer plates 26 which are disposed at a spaced distance from the ends of the magnetizable core by means of hollow tubes 36 through which screws 37 extend which securely hold the spacer plates 26 to the ends of the magnetizable core. The spacer plates 26 may be made of any suitable material and we prefer employing any suitable insulating material made of plastic composition. As shown in Figure 3, the spacer plate 26 is provided with a plurality of notched openings 34 which are in substantial alignment with the slots of the stator. The notched openings are arranged to receive the end of the perforated sleeve 25 to hold the sleeve at a distance from the inside surface of the slots.

In certain constructions of dynamo-electric machines, the length of the machine may be relatively long in the range of one to eight feet or longer and in these types of construction we provide for supporting the perforated sleeves intermediate their ends in order that they may not give as the coil sides are being inserted in the slots. For this type of construction, we employ a plurality of backing devices or flexible straps 29 and a plurality of side rods 30, see Figure 4, which will be sometimes referred to as backing means. The flexible backing straps 29 extend from one spacer plate to another and are arcuate in cross-section so as to fit in the enlarged cut-away portion 31 as shown in Figure 3. The side rods 30 also extend between the spacer plates 26 and are arranged to fit in the arcuate side notches 32. Considerable pressure may be applied to the coil sides while they are being inserted in the perforated sleeves in the slots. With the use of a backing means as indicated, the sleeves still maintain their centralized position within the slots. After the coil sides are inserted within the sleeve and the wires are properly adjusted, the backing strips 29 and rods 30 may be removed by withdrawing them in one direction from the spacer plate and the slots of the stator. The strips and rods are made flexible so that they may be bent to clear the windings as they are removed. The throat of the sleeves 25 may be closed by longitudinal strips 33 which may be made of any suitable perforated material to allow the insulating material which is to surround same to flow therethrough. The closure strips 33 are substantially U-shaped in cross-section and are arranged to fit inside of the sleeves 25. The closure strips keep the windings in the sleeves 25.

The coil heads 23 may be anchored to the spacer plates 26 by means of wrapping cord 38 which is shown by a dash-dot line. The wrapping cords 38 loop under the spacer plates and up over the coil heads, then back again under the plates. The wrapping cords 38 securely bind the coil heads to the spacer plates and prevent longitudinal moving of the windings within the slots. After the windings are securely mounted to the slots and after the backing means are removed, the windings are ready to be treated with the insulating material.

The insulating material may be applied to the windings by dipping the magnetizable core and the windings in a liquid-like insulating material or by casting or forming the insulating material about the windings in any suitable molds or dies such as illustrated in our application, Serial No. 450,240, hereinbefore identified. The materials suitable for insulation include the thermosetting plastics such as phenol-formaldehyde, urea-formaldehyde, and combinations or variations thereof; the thermoplastic such as polymers and co-polymers of vinyl chloride, vinyl acetate, vinylidene chloride, methyl methacrylate, and combinations or variations thereof as well as synthetic or natural waxes, resin, rubbers and rubber-like materials or combinations, variations and modifications thereof. Fillers, plasticizers and other substances may be added to obtain desirable electrical, physical, chemical and mechanical properties. Solvents may be employed to facilitate the application of any of these materials.

For submersible motors, the space between the outside surface of the sleeves 25 and the inside surface of the slots are completely filled with the insulated material indicated by the reference character 39 as shown in Figure 5 for stator construction, and as shown in Figure 7 for a rotor construction. The insulating material may also be molded or formed about the coil heads as indicated in Figure 6, making the total windings completely liquid-tight. The insulating material not only serves to insulate the windings, but also acts as a mechanical support for the windings and as a liquid-proof container around the windings. The windings are thus liquid-proof, insulation proof, and vibration-proof. The sleeves 25 may be made of substantially the same material as the insulation material so that they become readily fused together as one piece.

In those cases where the motors need not be made liquid-tight, the windings may then be dipped in an insulating material which is relatively thin to give a surface coating thereon while leaving a space between the outside surface of the coated sleeves and the inside surface of the slots so that the windings may be ventilated by forcing air or any other cooling medium between the outside surface of the coated sleeves and the inside surface of the slots. The distance between the outside surface of the sleeves and the inside surface of the slots may be of any suitable dimension and is preferably maintained at a minimum so long as enough space is provided to receive the insulated material for the purpose intended.

In this invention, the windings may be considered as floating within the slots of the magnetizable core, in that the windings are supported by a spider-like construction at a distance from the inside surface of the slots of the magnetizable core. Accordingly, by means of our construction, the insulating material may penetrate the slots to completely envelope the windings.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In the construction of a magnetizable core with a plurality of winding slots and windings in said slots, the improvement of spacer means for spacing the windings in the slots at a distance from the inside surface of the slots comprising, in combination, a sleeve for each of the slots to substantially envelope the winding, and means at the end of and connected to the core for engaging the sleeves and holding the sleeves in the slots at a distance from the inside surface of the slots said sleeves thereby providing an unobstructed passageway between the sleeves and the inside surface of the slots throughout the length thereof, and said means for engaging the sleeves providing communication from the said passageway in the slots to the core ends, whereby cooling media may be conducted through said passageway from the core ends to cool the magnetizable core.

2. In the construction of a magnetizable core with a plurality of winding slots and windings in said slots, the improvement of spacer means for spacing the windings in the slots at a distance from the inside surface of the slots comprising, in combination, a sleeve for each of the slots to envelope the winding, said sleeves having ends extending beyond the ends of the core, and means at the end of and connected to the core for engaging the sleeves and holding the sleeves in the slots at a distance from the inside surface of the slots said sleeves thereby providing an unobstructed passageway between the sleeves and the inside surface of the slots throughout the length thereof, and said means for engaging the sleeves providing communication from the said passageway in the slots to the core ends, whereby cooling media may be conducted through said passageway from the core ends to cool the magnetizable core.

3. In the construction of a magnetizable core with a plurality of winding slots and windings in said slots, the improvement of spacer means for spacing the windings in the slots at a distance from the inside surface of the slots comprising, in combination, a sleeve for each of the slots to envelope the winding, said sleeves having ends extending beyond the ends of the core, a plate on each end of, and connected to the core and having apertures for receiving the ends of the sleeves for holding the sleeves in the slots at a distance from the inside surface of the slots the said plate on each end of the core serving as bridge support members for the sleeves with the sleeves bridging therebetween and forming an unobstructed passageway space between the sleeves and the inside surface of the slots throughout the length thereof, and the said plate on each end of the core providing communication from the passageway in the slots to the core ends, whereby air may be conducted through said passageway to cool the said magnetizable core.

4. In the construction of a magnetizable core with a plurality of winding slots and windings in said slots, the improvement of spacer means for spacing the windings in the slot at a distance from the inside surface of the slots comprising, in combination, a sleeve for each of the slots to envelope the winding, said sleeves having ends extending beyond the ends of the core, a plate on each end of the core and having apertures for receiving the ends of the sleeves for holding the sleeves in the slots at a distance from the inside surface of the slots, each of said plates being spaced from and being constrained against lateral movement with reference to the ends of the core the said plate on each end of the core serving as bridge support members for the sleeves with the sleeves bridging therebetween and forming an unobstructed passageway space between the sleeves and the inside surface of the slots throughout the length thereof, and said plate on each end of the core providing communication from the passageway in the slots to the core ends, whereby an unobstructed passageway is provided throughout the core slots to the exterior of the core.

5. In the construction of a magnetizable core with a plurality of winding slots and windings in said slots, the improvement of spacer means for spacing the windings in the slot at a distance from the inside surface of the slots comprising, in combination, a sleeve for each of the slots to envelope the winding, said sleeves having ends extending beyond the ends of the core, a plate on each end of the core and having apertures for receiving the ends of the sleeves for holding the sleeves in the slots at a distance from the inside surface of the slots, each of said plates being spaced from and being constrained against lateral movement with reference to the ends of the core, removable backing means for the sleeves in the slots, said backing means having ends removably supported by the said plates.

6. In the construction of a magnetizable core with a plurality of winding slots and windings in said slots, the improvement of spacer means for spacing the windings in the slot at a distance from the inside surface of the slots comprising, in combination, a sleeve for each of the slots to envelope the winding, said sleeves having ends extending beyond the ends of the core, means at the end of and connected to the core for engaging the ends of the sleeves for holding the sleeves in the slots at a distance from the inside surface of the slots, and closure means for the sleeves to keep the windings in the sleeves said sleeves thereby providing an unobstructed passageway between the sleeves and the inside surface of the slots throughout the length thereof, and said means for engaging the sleeves providing communication from the said passageway in the slots to the core ends, whereby fluid media may be conducted through said passageway from the core ends.

7. In the construction of a magnetizable core with a plurality of winding slots and windings in said slots, the improvement of spacer means for spacing the windings in the slots at a distance from the inside surface of the slots comprising, in combination, a sleeve for each of the slots to substantially envelope the winding, and means at the end of and connected to the core for engaging the sleeves and holding the sleeves in the slots at a distance from the inside surface of the slots, said sleeves thereby providing an unobstructed space between the sleeves and the inside surface of the slots throughout the length thereof and a mass of insulating material between the sleeves and the inside surface of the slots.

8. A liquid-tight winding element for a dynamo-electric machine comprising a magnetizable core having a plurality of winding slots, a winding comprising coils with coil sides in said slots and coil heads at the end of the core, a sleeve for each of the slots to substantially envelop the winding side in the slot, said winding being closely compacted with interstices therebetween of smaller cross-sectional area than the cross-sectional area of an individual wire, a mass of insulating material of the class including polymerized and copolymerized substances in the slots comprising liquid-proof container about each sleeve and coil side, said mass of insulating material terminating in an annular ring upon each end of the core and enclosing the coil heads to make a fluid-tight winding, said insulating material in the slots and in the annular ring being integrally joined and set as a unitary mass by polymerizing without the application of pressure.

9. A liquid-tight winding element for a dynamo-electric machine comprising a magnetizable core having a plurality of winding slots, a winding comprising coils with coil sides in said slots and coil heads at the ends of the core, means anchored at the end of the core and bridging between the ends of the core and extending through the slots for stabilizing the coil sides in the slots at a distance from the inside surface of the slots, thereby forming an unobstructed space between the coil sides and the inside surface of the slots, throughout the length of the slots, a mass of insulating material of the class including polymerized and copolymerized substances in the said unobstructed space in the slots comprising a liquid-proof container about each coil side and the stabilizing means, said mass of insulating material terminating in an annular ring upon each end of the core, and means enclosing the coil heads to make a fluid-tight winding.

10. In the construction of a magnetizable core with a plurality of winding slots and windings in said slots, the improvement of spacer means for spacing the windings in the slots at a distance from the inside surface of the slots comprising, in combination, a sleeve for each of the slots to substantially envelope the winding, and means engaging the sleeves and the magnetizable core for holding the sleeves in the slots at a distance from the inside surface of the slots, said sleeves having a wall structure including a perforated sheet of material.

11. In the construction of a magnetizable core with a plurality of winding slots and windings in said slots and a mass of insulating material of the class including polymerized and copolymerized substances surrounding said windings in the slots and forming an annular mass upon each end of the core and enclosing the windings, the improvement of spacer means for spacing the windings in the slots at a distance from the inside surface of the slots comprising, in combination, a sleeve for each of the slots to substantially envelope the winding, and means engaging the sleeves and the magnetizable core for holding the sleeves in the slots at a distance from the inside surface of the slots, said sleeves thereby providing an unobstructed space for said insulating mass throughout the length of the slots, and said sleeve engaging means providing a passageway from the slots to the core end whereby said mass of insulating material in the core slots and in the annular masses on the ends of the core may be integrally connected.

12. In the construction of a magnetizable core with a plurality winding slots and windings in said slots, the improvement of spacer means for spacing the windings in the slots at a distance from the inside surface of the slots comprising, in combination, a sleeve for each of the slots to substantially envelope the winding, and means engaging the sleeves and the magnetizable core for holding the sleeves in the slots at a distance from the inside surface of the slots, said sleeves thereby providing an unobstructed passageway between the sleeves and the inside surface of the slots throughout the length thereof, said sleeve engaging means providing a passageway from the slots to the core ends, whereby continuous communication is provided from one end of the core to the other through the slots and around the sleeves.

FRANK J. SIGMUND.
WILLIAM S. HLAVIN.